United States Patent Office 2,964,547
Patented Dec. 13, 1960

2,964,547

PROCESS FOR THE PREPARATION OF MANGANESE CYCLOPENTADIENYL TRICARBONYL COMPOUNDS

Earl G. De Witt and Hymin Shapiro, Baton Rouge, La., and Jerome E. Brown, Detroit, Mich., assignors to Ethyl Corporation, New York, N.Y., a corporation of Delaware No Drawing. Filed Mar. 23, 1959, Ser. No. 800,950

4 Claims. (Cl. 260—429)

This invention relates to a process for the synthesis of novel hydrocarbon manganese carbonyl compounds. In particular, this invention relates to a process for the synthesis of cyclopentadienyl-type manganese tricarbonyl compounds hereinafter called cyclomatic manganese tricarbonyl compounds. This application is a continuation-in-part of our co-pending application, Serial No. 540,347, filed October 13, 1955, now abandoned, which is a continuation-in-part of our prior application Serial No. 325,224, filed December 10, 1952, now Patent No. 2,818,416, issued December 31, 1957.

A novel type of cyclomatic manganese tricarbonyl compounds in which the manganese is bonded to an organic or hydrocarbon radical by a carbon-to-manganese bond through a carbon which is part of a five-membered cyclopentadienyl-type ring have recently been discovered. These compounds have been found to be useful as additives to lubricating oils and hydrocarbon fuels for the purpose of improving their lubricating and combustion properties, as well as for other uses. The discovery of these valuable manganese compounds has sparked a search for an economical method of synthesizing them.

It is, therefore, an object of our invention to provide a new chemical process for the preparation of cyclopentadienyl-type manganese tricarbonyl compounds. It is also an object of this invention to provide a process for the synthesis of cyclopentadienyl-type manganese tricarbonyl compounds which employs simple chemical reagents or compounds. Another object of this invention is to provide a method for the synthesis of cyclomatic manganese tricarbonyl compounds which utilizes a minimum number of steps. Additional important objects of this invention will become apparent from the discussion which follows.

The above and other objects of this invention are accomplished by our process for the preparation of hydrocarbon cyclomatic manganese tricarbonyl compounds having the general formula

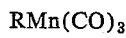

wherein R is a cyclomatic hydrocarbon radical having from 5 to 17 carbon atoms which embodies a group of 5 carbons having the general configuration found in cyclopentadiene, said compounds being further characterized in that the cyclomatic hydrocarbon radical is bonded to the manganese by carbon-to-manganese bonds through the carbons comprising the cyclopentadienyl group configuration, said process comprising simultaneously reacting manganese, carbon monoxide and cyclopentadienyl-type compounds having the general formula

RH wherein R is a cyclomatic hydrocarbon radical as stated above. The cyclopentadienyl-type manganese tricarbonyl compounds are produced in good yield and are readily purified.

One method of carrying out the process of this invention in the synthesis of cyclopentadienyl-type manganese tricarbonyl compounds comprises concurrently reacting a cyclopentadienyl-type compound, RH, and carbon monoxide with freshly-reduced manganese in a liquid medium, and especially carrying out the reduction reaction in the presence of the carbon monoxide. The liquid medium can be an ether, a hydrocarbon or a mixture of the two, as defined more fully hereinbelow. The cyclopentadienyl-type compound and the carbon monoxide are added in the vapor state to the reaction vessel either in separate streams or in combined streams. The carbon monoxide and vaporized cyclopentadienyl-type compound are introduced into the reaction vessel either above or below the surface of the solution containing the reactive manganese. A variation of the latter method is the addition of cyclopentadienyl-type compounds in the liquid form and concurrently adding carbon monoxide in the gaseous form while maintaining the contents of the reaction vessel in agitation. As stated above, the liquid cyclopentadienyl-type compound and the carbon monoxide can be introduced either above or below the surface of the liquid.

An alternative method of carrying out the process of our invention in the synthesis of the RMn(CO)₃ compounds comprises concurrently reacting reactive manganese with carbon monoxide and a vaporized or gaseous cyclopentadienyl-type compound, RH, without the presence of a liquid diluent or solvent. This is accomplished by passing the cyclopentadienyl-type compound and carbon monoxide over reactive manganese metal, e.g. a manganese compound and a reducing agent therefor, in a reaction zone maintained at a temperature sufficient to bring about reaction between the three components to form cyclopentadienyl-type manganese tricarbonyl compounds.

In other words, the present invention comprises concurrently introducing into manganese metal, or an active form thereof, a cyclomatic group and electron donating groups, namely, carbon monoxide. Thus, by reacting manganese metal, preferably as a finely-divided active powder, concurrently with both a cyclomatic hydrocarbon such as cyclopentadiene and carbon monoxide under suitable conditions of temperature and pressure, the product cyclopentadienyl manganese tricarbonyl is obtained.

Our process is especially preferred for the synthesis of compounds in which at least one of the carbon-to-carbon double bonds in the cyclopentadienyl group configuration is olefinic in nature. In other words, in this preferred embodiment not more than two carbons of the cyclopentadienyl ring should be shared with a fused aromatic ring such as a benzene ring. An example of one of the cyclomatic radicals of this preferred embodiment is the indenyl radical,

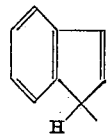

when R, the cyclomatic radical, has this type of configuration or structure, that is, where at least one double bond in the cyclopentadienyl group configuration is olefinic, the resulting cyclomatic manganese compounds are found to have the optimum characteristics for use as fuel and lubricating oil additives.

The cyclopentadienyl-type compounds used in the process of our invention consist of a cyclopentadienyl nucleus, the carbon skeleton of which can have other organic or hydrocarbon substituents thereon having up to 12 or more carbon atoms.

When a cyclomatic radical of the compounds prepared by the process of our invention is substituted with univalent aliphatic radicals, these substituents can be a radical selected from the group consisting of alkyl, alkenyl, aralkyl and aralkenyl. Thus, when these substituents are univalent aliphatic radicals, they can be alkyl radicals, such as methyl, ethyl, n-propyl, isopropyl, n-butyl, isobutyl, sec-butyl, t-butyl, n-amyl, the various positional isomers thereof as, for example, 2-methylbutyl, 1,1-dimethylpropyl, 1-ethylpropyl, and the corresponding straight and branched chain isomers of hexyl, heptyl, octyl, nonyl, decyl, undecyl, dodecyl, tetradecyl, hexadecyl, nondecyl, eicosyl, and the like. Likewise, the univalent aliphatic substituent can be an alkenyl radical, such as ethynyl, $\Delta^1$-propenyl, $\Delta^2$-propenyl, isopropenyl, $\Delta^1$-butenyl, $\Delta^2$-butenyl, $\Delta^3$-butenyl, and the branched chain isomers thereof as $\Delta^1$-isobutenyl, $\Delta^2$-isobutenyl, $\Delta^1$-sec-butenyl, $\Delta^2$-sec-butenyl, $\Delta^1$-pentenyl, $\Delta^2$-pentenyl, and the branched chain isomers thereof $\Delta^1$-hexenyl, $\Delta^3$-hexenyl, $\Delta^4$-hexenyl, and the branched chain isomers thereof, including 3,3-dimethyl-$\Delta^1$-butenyl, 2,3-dimethyl-$\Delta^2$-butenyl, and 1-methyl-1-ethyl-$\Delta^2$-propenyl, and the various isomers of heptenyl, octenyl, nonenyl, decenyl, undecenyl, dodecenyl, tetradecenyl, heptadecenyl, octodecenyl, eicosenyl, and the like.

When the organic radical substituted in the cyclomatic group is a univalent aliphatic radical, it can be an aralkyl radical such as, for example, benzyl, α-phenylethyl, β-phenylethyl, β-phenylpropyl, α-phenylpropyl, α-phenylisopropyl, α-phenylbutyl, α-phenylisobutyl, β-phenyl-t-butyl, α'-naphthylmethyl, β'-naphthylmethyl, α-(α'-naphthyl)-ethyl, β-(α'-naphthyl)-ethyl, α-(α'-naphthyl)-propyl, α-(β'-naphthyl)-isopropyl, γ-(α'-naphthyl)-butyl, α-(α'-naphthyl)-isobutyl, β-(β'-naphthyl)-sec-butyl, the corresponding α'- and β'-naphthyl derivatives of n-amyl and the various positional isomers thereof, and the like. Other such aralkyl radicals include the α'-, β'-, and γ'-anthryl derivatives of alkyl radicals such as α'-anthrylmethyl, β-(γ'-anthryl)-ethyl, Δ-(β-anthryl)-2-methylamyl, and the like, and the corresponding alkyl derivatives of phenanthrene, fluorene, acenaphthene, chrysene, pyrene, triphenylene, naphthacene, etc. The univalent aliphatic radical can be an aralkenyl radical such as α-phenylethenyl, β-phenylethenyl, α-phenyl-$\Delta^1$-propenyl, and the phenyl derivatives of the isomers of butenyl, pentenyl, heptenyl, and the like, up to about eicosenyl. Other such arylalkenyls include α-(α'-naphthyl)-ethenyl, α-(β'-naphthyl)-ethenyl, α-(α'-naphthyl)-$\Delta^1$-propenyl, α-(α'-naphthyl)-$\Delta^2$-propenyl, α-(β'-naphthyl)-isopropenyl, and the like. In addition, such aromatic derivatives of alkenyls, that is, aralkenyl radicals include derivatives of phenanthrene, fluorene, acenaphthene, chrysene, naphthacene, and the like.

When the organic radicals comprising the substituents in the cyclomatic groups of the compounds are univalent alicyclic radicals, these can be radicals selected from the group consisting of cycloalkyl and cycloalkenyl radicals. Thus, such univalent alicyclic radicals can be cycloalkyl radicals such as, for example, cyclopropyl, cyclobutyl, cycloamyl, cyclohexyl, cyclononyl, cyclodecyl, cyclododecyl, cyclooctodecyl, cycloeicosyl, and such cycloaliphatic radicals as α-cyclopropylethyl, α-cyclobutylpropyl, and the like. Similarly, the alicyclic radical substituents can be cycloalkenyl radicals such as α-cyclohexylethenyl, α-cycloheptyl-$\Delta^1$-propenyl, β-cyclooctyl-$\Delta^2$-propenyl, α-methylene-β-cyclododecylethyl, and the like.

When the organic radicals substituted in the cyclomatic groups are univalent aromatic radicals, they can be selected from the group consisting of aryl and alkaryl radicals. Thus, these univalent aromatic radicals can be aryl radicals such as, for example, phenyl, naphthyl, anthryl, and the like, including the various monovalent radicals of such aromatics as indene, acenaphthene, fluorene, naphthacene, chrysene, and the like. Moreover, these univalent aromatic radicals can be alkaryl radicals such as, for example, tolyl, 3,5-xylyl, p-cumenyl, mesityl, ethylphenyl, 2-methyl-α-naphthyl, 1-ethyl-β-naphthyl, and the like.

Having amply described the meaning of the term "organic radical" the discussion with regard to cyclomatic radicals has been facilitated. As stated hereinabove, the cyclomatic groups of the compounds prepared by the process of the present invention can be represented by four general formulae. The first class of cyclomatic radicals can be represented by the general formula

(I)

wherein each of $R_1$, $R_2$, $R_3$, $R_4$ and $R_5$ can be the same or different and is selected from the group consisting of hydrogen and organic or hydrocarbon radicals having from about 1 to about 12 or more carbon atoms. Illustrative examples of such cyclomatic radicals include cyclopentadienyl; 1-methylcyclopentadienyl; 2,3-dimethylcyclopentadienyl; 3-ethylcyclopentadienyl; 1,3,4-tripropylcyclopentadienyl; 1,5 - dipentylcyclopentadienyl; 2-methyl-4-t-butylcyclopentadienyl; 3-isopropenylcyclopentadienyl; 3,4 - di($\Delta^2$ - isobutenyl) - cyclopentadienyl; 3-methyl-5-($\Delta^1$-pentenyl) - cyclopentadienyl; 3 - (β - phenylethyl)-cyclopentadienyl; 3-cyclohexylcyclopentadienyl; 2-phenylcyclopentadienyl; 1-ethyl-3-(α-methyl)-cyclopentadienyl; 2-(o-tolyl)-cyclopentadienyl; 1-acetylcyclopentadienyl; and the like.

The second type of cyclomatic radical is the indenyl-type radical represented by the general formula

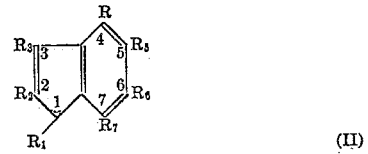

(II)

wherein each of $R_1$, $R_2$, $R_3$, $R_4$, $R_5$, $R_6$, and $R_7$ can be the same or different and is selected from the group consisting of hydrogen and organic and hydrocarbon radicals having from 1 to about 12 or more carbon atoms. Illustrative examples of such cyclomatic radicals include indenyl; 2-methylindenyl; 3-sec-butylindenyl; 3,4-diethenylindenyl; 5 - (α - phenylbutyl) - indenyl; 3-cyclohexylindenyl; 3-phenylindenyl; 4,5-diphenylindenyl, and the like.

The third type of cyclomatic radical of the new compositions of matter prepared by the process of the present invention is a radical of the fluorenyl type which can be represented by the general formula

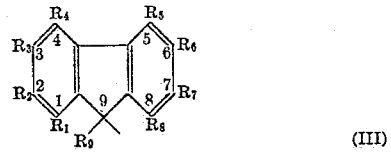

(III)

wherein each of $R_1$, $R_2$, $R_3$, $R_4$, $R_5$, $R_6$, $R_7$, $R_8$ and $R_9$ can be the same or different and is selected from the group consisting of hydrogen and organic and hydrocarbon radicals having from 1 to about 12 or more carbon atoms. Illustrative examples of such radicals include fluorenyl; 3-ethylfluorenyl; 4,5-dipropylfluorenyl; 9-methylfluorenyl; 6-ethenylfluorenyl; 4-benzylfluorenyl; 2-m-tolyl-fluorenyl, and the like.

The fourth type of cyclomatic radical, that is, a radical containing the cyclopentadienyl moiety can be represented by the general formula

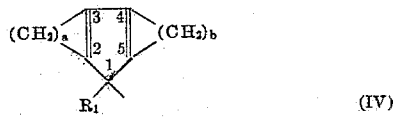

(IV)

wherein "a" and "b" can be the same or different and are small whole integers including zero and excluding one, the sum $a+b$ being at least two, and wherein $R_1$ is selected from the class consisting of hydrogen and organic radicals. Thus, when "a" is zero, each of the carbon atoms designated as 2 and 3 have attached thereto a monovalent radical selected from the class consisting of hydrogen and organic radicals. Furthermore, the monovalent radicals so attached can be the same or different. The same discussion applies to each of the carbon atoms designated as 4 and 5 when "b" is zero. Illustrative examples of this type of cyclomatic radical include 4,5,6,7-tetrahydroindenyl; 1,2,3,4,5,6,7,8-octahydrofluorenyl; 3-methyl-4,5,6,7-tetrahydroindenyl, and the like.

Non-limiting examples of the compounds prepared by the process of this invention in which the cyclomatic radical has the configuration shown in Structure I above are cyclopentadienyl manganese tricarbonyl; methylcyclopentadienyl manganese tricarbonyl; ethylcyclopentadienyl manganese tricarbonyl; propylcyclopentadienyl manganese tricarbonyl; butenylcyclopentadienyl manganese tricarbonyl; tert-butylcyclopentadienyl manganese tricarbonyl; hexylcyclopentadienyl manganese tricarbonyl; cyclohexylcyclopentadienyl manganese tricarbonyl; heptylcyclopentadienyl manganese tricarbonyl; decylcyclopentadienyl manganese tricarbonyl; dodecylcyclopentadienyl manganese tricarbonyl; 1,2,3,4-tetramethylcyclopentadienyl manganese tricarbonyl; 1,2,3,4,5-pentamethylcyclopentadienyl manganese tricarbonyl; 1,3-dibutylcyclopentadienyl manganese tricarbonyl; 1,2-dipropyl-3-cyclohexylcyclopentadienyl manganese tricarbonyl; tolylcyclopentadienyl manganese tricarbonyl; 1,3-diphenylcyclopentadienyl manganese tricarbonyl; acetylcyclopentadienyl manganese tricarbonyl, and the like.

When there is only one organo or hydrocarbo substituent on the cyclopentadienyl ring, its position is not specified since, according to theory, the cyclopentadienyl ring or group is bonded to the manganese by five equivalent bonds running from each of the five carbons in the cyclopentadienyl ring to the manganese. Since all these bonds are equivalent and all five carbons in the ring are equidistant from the manganese, it is immaterial to which of the five carbons a single substituent is attached. When, however, more than one substituent is attached to the cyclopentadienyl ring, the positions are given so as to indicate the relative positions of the different substituents with respect to each other on the cyclopentadienyl ring.

Examples of compounds having the configuration of Structure II given hereinabove are indenyl manganese tricarbonyl; 3-methylindenyl manganese tricarbonyl; 3-ethenylindenyl manganese tricarbonyl; 2,3-dimethylindenyl manganese tricarbonyl; 1,3-diethylindenyl manganese tricarbonyl; 1,7-diisopropylindenyl manganese tricarbonyl; 1,2,3,4,5,6,7-heptamethylindenyl manganese tricarbonyl; 5-phenylindenyl manganese tricarbonyl; 3(2-ethylphenyl) indenyl manganese tricarbonyl, etc.

Examples of compounds having the configuration of Structure III above are fluorenyl manganese tricarbonyl; 3-ethylfluorenyl manganese tricarbonyl; 4-propylfluorenyl manganese tricarbonyl; 2,3,4,7-tetramethylfluorenyl manganese tricarbonyl, and the like.

Examples of compounds having the configuration of Structure IV above are 4,5,6,7-tetrahydroindenyl manganese tricarbonyl; 3-methyl-4,7-dihydroindenyl manganese tricarbonyl; 2-ethyl-3-phenyl-4,5,6,7-tetrahydroindenyl manganese tricarbonyl; 1,2,3,4,5,6,7,8-octahydrofluorenyl manganese tricarbonyl; 1,4,5,8-tetrahydrofluorenyl manganese tricarbonyl, and the like.

As stated hereinabove, the process of this invention comprises concurrently reacting manganese metal with carbon monoxide and cyclopentadienyl-type compounds to produce cyclopentadienyl-type manganese tricarbonyl products. The manganese should be in a reactive state. Such reactive manganese metal can be obtained in a number of ways. For example, manganese obtained by chemical reduction from manganese compounds is usually deposited in very finely divided form which is usually in a very reactive state. Another method of obtaining reactive manganese is by the reduction of oxides and sulfides of the metal at elevated temperatures with the aid of hydrogen, carbon, boron, etc. Another method of obtaining finely divided, highly-reactive manganese is by distilling off mercury from manganese amalgam. Electrolytic deposition of manganese from a bath of its fused salts produces a reactive form of manganese provided it is not permitted to be contaminated with manganese oxides. The thermal decomposition of certain manganese compounds, such as manganese pentacarbonyl, also produces manganese in the finely-divided active state. In all these cases the manganese metal once produced should be kept out of contact with either water or oxygen as manganese reacts readily with these reagents forming manganese hydroxide and manganese oxides. The manganese oxides are very stable compounds and a coating of these on the surface of manganese metal renders the metal inactive.

In order to prevent contamination of the manganese metal once it has been obtained in the reactive state, it should be employed immediately thereafter. Thus, when the process is to be carried out in a liquid medium, it is preferable to produce the reactive manganese by chemical reduction of manganese compounds in that medium and react it with carbon monoxide and cyclopentadienyl-type compounds as soon as possible after its formation. Should a transfer operation be required to transfer the reactive manganese from one vessel to another, care should be taken that this is performed in an inert atmosphere, such as nitrogen, argon, helium, methane, ethane, propane and other hydrocarbons. Ether vapors may also be used to constitute an inert atmosphere.

When the reaction is carried out in solution as, for example, when manganous chloride or other compound is reduced with sodium or other group Ia, IIa, or IIIa metal to give manganese metal in finely-divided form, the carbon monoxide and cyclopentadienyl-type compounds, such as methylcyclopentadiene, is preferably added simultaneously to the solution where they will react with the manganese to form cyclopentadienyl-type manganese tricarbonyl compounds, such as methylcyclopentadienyl manganese tricarbonyl, $(C_6H_7)Mn(CO)_3$. Both the carbon monoxide and the cyclomatic compound can be added to the reaction vessel in the vapor state by bubbling the vapors through the solution. The stream of vaporized cyclopentadienyl compound can be combined with the carbon monoxide stream and the resultant gaseous stream admitted to the reaction vessel, or the two reagents may be admitted separately. Another method is to add the cyclopentadienyl-type compound in the liquid form while passing carbon monoxide through the reaction mixture, in which case the two react concurrently with the manganese to form the cyclopentadienyl-type manganese tricarbonyl compounds.

The reaction between manganese metal, carbon monoxide, and cyclopentadienyl-type compounds can also be carried out without the presence of liquid solvents or diluents. For example, cyclopentadienyl-type compounds can be vaporized and passed together with carbon monoxide over manganese metal in a reaction zone which is kept at a temperature necessary for reaction to occur, which temperature can be in the range of from about 40° C. to about 400° C. As in the case of reaction in solution, the carbon monoxide and the cyclomatic compound vapors can be admitted to the reaction zone either as a mixture of the two or in individual streams.

The following examples will more clearly illustrate the methods by which the process of this invention can be carried out.

EXAMPLE I

*Methylcyclopentadienyl manganese tricarbonyl*

A reaction vessel equipped with means for charging and discharging solids, gas inlet and outlet means, temperature measuring devices, heating and cooling means, means for agitation, and means for condensing vapors was flushed with prepurified nitrogen. To the flask was then added 60 parts of dimethylformamide, 2 parts of magnesium powder, 4 parts of methylcyclopentadiene dimer and 4 parts of manganous chloride. The vessel was then pressurized with 3,600 p.s.i.g. of carbon monoxide. The mixture was then heated to 195° C. and maintained at this temperature for 4½ hours. At the end of this time, the product is recovered from the reaction mixture by addition of 400 parts of water, followed by steam distillation. The product was thereafter extracted with carbon tetrachloride and filtered. The methylcyclopentadienyl manganese tricarbonyl consists of a yellow, air-stable, water-soluble liquid.

When the above example was repeated using carbon monoxide pressures of 8,000, 12,000 and 14,000 p.s.i.g., similar results were obtained.

EXAMPLE II

*Cyclopentadienyl manganese tricarbonyl*

A reaction vessel employed in Example I is flushed with prepurified nitrogen. To the flask are then added 400 parts of tetrahydrofuran and 23 parts of sodium dispersed in 23 parts of mineral oil. An atmosphere of nitrogen is maintained in the reaction vessel throughout the run. To this solution containing dispersed sodium is added 63 parts of anhydrous manganous chloride. The mixture is then heated and maintained at reflux temperature whereupon the manganous chloride reacts with the sodium to form manganese metal in finely-divided form. Cyclopentadiene in the dimer form is heated in another vessel to about 180° C. at which temperature cracking to the monomer occurs and 33 parts of the vapor of the latter are conducted by connecting tubing to the reaction vessel containing the freshly-reduced manganese and introduced below the surface of the reaction mixture. At the same time, carbon monoxide is also admitted to the reaction vessel through another inlet and bubbled through the mixture. Since the reaction vessel is at atmospheric pressure, the pressure of the cyclopentadiene vapor and of the carbon monoxide is maintained at slightly above atmospheric, 0.5 to about 5 p.s.i.g., in order to effect introduction into the reaction mixture. The reaction mixture is maintained at a temperature of essentially 65° C. for a period of about seven hours. At the end of this time, the product is separated from the ether and the mineral oil by distillation at reduced pressure and the product purified by fractional sublimation. The latter consists of a yellow, air-stable, water-soluble solid having a melting point of 77° C. which, on analysis, is found to contain 47.2% carbon, 2.48% hydrogen and 26.9% manganese, corresponding to the formula $(C_5H_5)Mn(CO)_3$ for cyclopentadienyl manganese tricarbonyl, calculated 47.0% carbon, 2.47% hydrogen and 26.9% manganese.

Cyclopentadienyl manganese tricarbonyl is likewise obtained in good yield when cyclopentadiene and carbon monoxide are reacted with manganese as in Example II at a temperature of 0° C. in a closed vessel with the pressure of carbon monoxide maintained at 10,000 atmospheres and the cyclopentadiene being introduced in the liquid form. Pressures of carbon monoxide as high as 20,000 atmospheres also give good results.

EXAMPLE III

Fifteen parts of $MnSO_4$ in 40 parts of allyl tolyl ether are added to the reaction vessel described in Example I above. To this is added 2.7 parts of aluminum turnings. A stream of combined methylcyclopentadiene and carbon monoxide is passed into this reaction vessel at a temperature of essentially 210° C. at a pressure of from 0.1 to 5 p.s.i.g. Thus, while the aluminum displaces the manganese from its salt, it immediately reacts with the methylcyclopentadiene and the carbon monoxide to form methylcyclopentadienyl manganese tricarbonyl. The product is separated by fractional distillation at reduced pressure. It is a yellow-orange liquid having a freezing point of −0.75° C., a refractive index $(n_D^{20})$ of 1.5873, and a density $(d_{20}^4)$ of 1.3942. Analysis of the compound shows it to contain 24.7% manganese, 49.9% carbon and 3.16% hydrogen, corresponding to the formula $(C_6H_7)Mn(CO)_3$ for methylcyclopentadienyl manganese tricarbonyl, calculated 25.2% manganese, 49.6% carbon and 3.21% hydrogen.

When the procedure of Example III is repeated at a temperature of 210° C., a good yield of methylcyclopentadienyl manganese tricarbonyl is obtained.

Similarly good results are obtained when other manganese salts are reduced with aluminum as, for example, the reduction of manganese halides, such as $MnCl_2$, $MnBr_2$, $MnF_2$, $MnI_2$, and manganese nitrate.

EXAMPLE IV

The procedure of Example I is carried out employing manganous acetate with magnesium metal as the reducing agent in a medium consisting of a mixture of toluene and ethylene glycol diethyl ether. Phenylcyclopentadiene is slowly added to the reaction mixture maintained in constant agitation and at temperatures above 80° C., while carbon monoxide gas is added below the surface of the liquid contents. A good yield of phenylcyclopentadienyl manganese tricarbonyl is obtained.

EXAMPLE V

To a reaction vessel are added 19 parts of lithium aluminum hydride, $LiAlH_4$, in 800 parts of tetrahydrofuran. To this solution are added 215 parts of manganese dibromide and the solution heated to 65° C. for a period of two hours. The manganese compound is reduced to a metallic manganese which is separated from the solution and washed with ether, the process being conducted under an inert atmosphere of nitrogen. The manganese metal is placed in 300 parts of an equal volume mixture of tetrahydrofuran and toluene, and to this is added 120 parts of indene in small increments while passing a slow stream of carbon monoxide through the solution. The temperature of the reaction vessel is maintained at essentially 65° C. for a period of ten hours to produce indenyl manganese tricarbonyl.

Manganese salts can be reduced to the metallic manganese by metals above manganese in the electromotive series, which, in addition to those used in the illustrative examples above, are lithium, rubidium, potassium, strontium, barium, calcium, beryllium, and uranium. In addition to the manganese salts used in the illustrative examples, other salts can be employed, such as manganous benzoate, manganous carbonate, manganous phosphate, manganic phosphate, manganous fluoride, manganous iodide, manganese salts of β-keto esters such as the manganese salts of ethyl acetoacetate, etc.

EXAMPLE VI

Manganese amalgam is decomposed by heating in a thermal reactor while passing a stream of hydrogen through the reaction chamber. The mercury is thus distilled out, leaving powdered manganese metal. Methylcyclopentadiene is then vaporized in a reaction vessel and the vapors passed by means of connecting tubing through the thermal reactor containing the manganese powder, care being taken that no oxygen is present. Carbon monoxide gas is fed into the methylcyclopentadiene vapor stream so that the combined vapors of methylcyclopentadiene and carbon monoxide pass over the manganese powder at temperatures of substantially 400° C. and at slightly above atmospheric pressure. In this way, methylcyclopentadienyl manganese tricarbonyl is obtained which distills out of the reactor through a connecting condenser tube and is collected as a stable liquid. Methylcyclopentadiene and carbon monoxide which are not reacted are recycled over the active manganese powder.

When pressures of carbon monoxide above atmospheric and up to 20 or more atmospheres are employed, together with partial pressures of the cyclopentadienyl compound of up to 5 atmospheres, the apparatus is so arranged that the cyclopentadienyl-type manganese tricarbonyl compound is removed by gravity from the reaction zone as soon as it is formed, and collected in an appropriate receiver.

A good yield of product is obtained when the process of Example V is carried out in a thermal reactor tube at a temperature of substantially 200° C. and at a reduced pressure of 350 mm. of mercury. Temperatures and pressures in the thermal reactor as low at 100° C. and 8 mm. of mercury also produce good yields.

In variations of this process nitrogen, argon, and other inert gases are employed as carriers for the cyclopentadienyl-type compound vapors. In many instances, the same purpose can be accomplished by passing the carbon monoxide gas through the reaction vessel in which the cyclopentadienyl-type compound is being vaporized.

EXAMPLE VII

Manganese oxide is reduced to the metal by passing hydrogen over powdered manganese oxide in a thermal reactor at temperatures above 1200° C. The freshly-reduced manganese is then reacted with a mixture of cyclopentadiene and methylcyclopentadienyl vapor and carbon monoxide, as in Example VI, at a temperature of 80° C. and a pressure of 5 mm. of mercury to give a product consisting of a mixture of cyclopentadienyl manganese tricarbonyl and methylcyclopentadienyl manganese tricarbonyl.

Allylcyclopentadienyl manganese tricarbonyl is prepared in a similar manner, employing a temperature of about 40° C.

EXAMPLE VIII

A mixture of manganous oxide and carbon is heated to a temperature of over 1100° C. to reduce the oxide to manganese metal. Then, as in Example VI, vapors of 1-naphthyl-2-ethylcyclopentadiene, together with carbon monoxide, are passed over the reactive manganese metal at a temperature and pressure sufficient to distill off the product 1-naphthyl-2-ethylcyclopentadienyl manganese tricarbonyl which is formed.

Manganese sulfide is reduced in a manner similar to the reduction of manganese oxide by the use of carbon to the metallic manganese which is then reacted with cyclopentadienyl-type compounds and carbon monoxide, as illustrated in the examples given above. Other cyclopentadienyl-type compounds that are employed are substituted indenyl compounds, such as 1-methylindene, 4-ethyl-indene and also fluorenyl-type compounds such as methylfluorene, octahydrofluorene, etc., to give such products as 1-methylindenyl manganese tricarbonyl, 4-ethylindenyl manganese tricarbonyl, methylfluorenyl manganese tricarbonyl, octahydrofluorenyl manganese tricarbonyl, etc.

There are a number of advantages in concurrently reacting cyclopentadienyl compounds, carbon monoxide and manganese metal as taught in this invention. One advantage is that stable compounds are formed directly from the manganese metal without going through air and water-unstable intermediates. Thus, the end products collected from a thermal reaction zone, or obtained in a reaction solution mixture, can be separated and purified without fear of contamination or decomposition due to the oxygen in the atmosphere. Another advantage is that only the stoichiometric amount of cyclopentadienyl-type compounds required for the final products are used in the process since no intermediates are prepared. The further advantage of reacting the three components simultaneously is that the carbon monoxide gas acts as a protective atmosphere excluding oxygen. This function of carbon monoxide dispenses with the use of inert atmospheres, such as nitrogen, which are ordinarily employed when the cyclopentadienyl manganese tricarbonyl compounds are prepared stepwise. This tends to make the present process economically and technically more attractive.

An especially preferred method of carrying out the process of our reaction is the reaction of carbon monoxide and vapors of cyclopentadienyl-type compounds with dry manganese metal in the suitably active form. When conducting the process in this manner, the temperature can be kept at a suitably high level so that any cyclopentadienyl-type compounds that do not react with the manganese can be recycled. Only one product is produced in this manner and there is no need of a separation step, as no solvents or other liquid diluents are present. The process of purification of the final product is thus rendered less complicated.

When the cyclopentadienyl compounds are added to the reaction vessels in the vapor phase, there is the advantage that the vapors can be used immediately upon distillation from the liquid cyclopentadienyl compound, thus obviating storage problems of freshly-distilled cyclopentadienyl compounds which have a tendency to polymerize even at room temperature.

The temperature at which the reaction is conducted depends on the cyclopentadienyl compound that is employed, as well as on the form of the manganese metal. In general, the temperature will vary from 0° C. to about 400° C. The upper limit of the temperature will depend on the decomposition temperature of the final product. When manganese metal is reacted with carbon monoxide and cyclopentadienyl-type compounds in the vapor phase, the temperature ranges from about 40° C. to about 400° C. as illustrated in the examples given hereinabove. A preferred range of temperatures, however, is from 100° C. to about 280° C., as best yields of products are obtained within this range. When the reaction is conducted in a liquid medium, the temperature ranges from about 0° C. to about 210° C. The upper limit is usually determined by the boiling point of the liquid medium at the pressure employed. Good results are obtained when any of the temperatures within this range are employed.

As to the reactivity of the manganese metal, the more reactive the manganese, the lower the temperature required at which the cyclopentadienyl-type compounds and carbon monoxide will react with the metal. As stated hereinabove the more reactive form of manganese is the freshly deposited or reduced manganese powder which has not been contaminated by contact with such agents as oxygen of the atmosphere. Other reactive forms of manganese include freshly ground or pulverized manganese, manganese turnings obtained by turning manganese on a lathe, and manganese which has been cast and strained so as to render it highly reactive in the process of the instant invention. Thus, it is seen that the manganese employed can be in the form of finely-divided particles which have a size ranging from less than 5 microns to 1000 or more microns. The manganese turnings may be ribbon-shaped having a thickness of from 5 to about 1000 microns or more. Cast manganese bars would, of course, contain large amounts of manganese in one piece of from less than one gram to several thousand grams in weight.

The examples above illustrated methods in which the vapors of the cyclopentadienyl-type compounds and the carbon monoxide are admitted or passed through the reaction zone at pressures slightly above atmospheric. The process can also be conducted at reduced pressures, as well as pressures above atmospheric. It is found that pressures of carbon monoxide from less than 1 atmosphere to about 10,000 atmospheres give satisfactory results. However, pressures of carbon monoxide as high as 20,000 atmospheres can be employed.

The contact time between the carbon monoxide, the cyclopentadienyl-type compounds, and the manganese metal will also vary as a function of the reactivity of the manganese metal surface and upon the cyclopentadienyl-type compound used.

Solvents other than tetrahydrofuran, ether and toluene, which are used in our process, include such compounds as n-butyl ether, dodecyl ether, dioxane, diphenyl ether, dimethyl ether of ethylene glycol, benzene, xylene and cyclohexane, as well as mixtures of two or more of these. That is, ethers and hydrocarbons having from 2 to about 24 carbon atoms can be employed.

The cyclopentadienyl-type manganese tricarbonyl compounds are purified by such methods as fractional distillation or sublimation at reduced pressures. When the products are formed in a liquid medium, such as tetrahydrofuran, separation can be effected by steam distillation and the product further purified by fractional distillation at reduced pressure. Selective solvents can also be used to separate the product from diluents or solvents and further purification effected by fractional distillation, sublimation, or both.

The compounds prepared by the process of this invention find use as antiknock agents in hydrocarbon fuels in both leaded and non-leaded varieties. Other important uses of the cyclomatic compounds include the use thereof as chemical intermediates, particularly in the preparation of metal and metalloid containing polymeric materials. In addition, some of the cyclomatic derivatives of the compounds prepared by the process of this invention can be used in the manufacture of medicinals and other therapeutic materials, as well as agricultural chemicals such as, for example, fungicides, insecticides, defoliants, and plant growth regulants.

Having fully described the process of this invention, the need therefor, and the best method of carrying it out, we do not intend that our invention be limited except within the spirit and scope of the appended claims.

We claim:

1. A process for the preparation of hydrocarbon cyclomatic manganese tricarbonyl compounds having the general formula $$RMn(CO)_3$$

wherein R is a cyclomatic hydrocarbon radical having from 5 to 17 carbon atoms which embodies a group of 5 carbons having the general configuration found in cyclopentadiene, said compounds being further characterized in that the cyclomatic hydrocarbon radical is bonded to the manganese by carbon-to-manganese bonds through the carbons comprising the cyclopentadienyl-group configuration, said process comprising simultaneously reacting manganese, carbon monoxide, and cyclopentadienyl-type compounds having the general formula $$RH$$

wherein R is a cyclomatic hydrocarbon radical as stated above at a temperature between about 0° C. to about 400° C.

2. The process of claim 1 wherein the cyclomatic compound and carbon monoxide are contacted in the vapor phase with manganese metal at a temperature within the range of from about 40° C. to about 400° C.

3. A process for the preparation of methylcyclopentadienyl manganese tricarbonyl comprising contacting manganese metal simultaneously with carbon monoxide and methylcyclopentadiene vapor at a temperature of substantially about 40° C. to about 400° C.

4. A process for the preparation of hydrocarbon cyclomatic manganese tricarbonyl compounds having the general formula $$RMn(CO)_3$$

wherein R is a cyclomatic hydrocarbon radical having from 5 to 17 carbon atoms which embodies a group of 5 carbons having the general configuration found in cyclopentadiene, said compounds being further characterized in that the cyclomatic hydrocarbon radical is bonded to the manganese by carbon-to-manganese bonds through the carbons comprising the cyclopentadienyl-group configuration, said process comprising simultaneously reacting a manganese compound, a reducing agent capable of reducing said manganese compound to metallic manganese, carbon monoxide, and cyclopentadienyl-type compounds having the general formula $$RH$$

wherein R is a cyclomatic hydrocarbon radical as stated above at a temperature between about 0° C. to about 400° C.

No references cited.